United States Patent [19]

Kouda

[11] Patent Number: 4,786,447
[45] Date of Patent: Nov. 22, 1988

[54] METHOD OF MOLDING SKIN-COVERED FOAMED PLASTIC ARTICLE

[75] Inventor: Hiroshi Kouda, Kanagawa, Japan

[73] Assignee: Ikeda Bussan Co., Ltd., Ayase, Japan

[21] Appl. No.: 60,635

[22] Filed: Jun. 11, 1987

[30] Foreign Application Priority Data

Jul. 21, 1986 [JP] Japan ................ 61-171362

[51] Int. Cl.$^4$ ............................................. B29C 63/26
[52] U.S. Cl. ....................... 264/46.6; 249/95; 264/46.4; 425/112
[58] Field of Search ............ 264/46.4, 46.6, 45.1, 264/219, 267, 250, 46.8; 297/DIG. 1; 425/112; 249/95

[56] References Cited

U.S. PATENT DOCUMENTS

| | | | |
|---|---|---|---|
| 3,950,462 | 4/1976 | Shaffer et al. | 264/46.8 |
| 3,971,112 | 7/1976 | Amato et al. | 264/46.6 |
| 4,383,955 | 5/1983 | Rubio et al. | 264/46.6 |
| 4,525,408 | 6/1985 | Johansson | 264/46.5 |
| 4,551,290 | 11/1985 | Mizell | 264/46.6 |

FOREIGN PATENT DOCUMENTS

56-49232  4/1980  Japan ................ 264/46.6

Primary Examiner—Jan H. Silbaugh
Assistant Examiner—Allan R. Kuhns
Attorney, Agent, or Firm—Foley & Lardner, Schwartz, Jeffery, Schwaab, Mack, Blumenthal & Evans

[57] ABSTRACT

A method of molding a skin-covered foamed plastic article, which includes putting a skin member on a shaping device in a manner to cover the same thereby to prepare a first temporary unit, attaching shaping dies to the first temporary unit in a manner to cover the same thereby to prepare a second temporary unit, removing the shaping device from the second temporary unit thereby to prepare a third temporary unit, placing the third temporary unit in a mold in such a manner that a mouth portion of the third temporary unit is directed upward, pouring a liquid material of foamed plastics into the third temporary unit through the mouth portion, placing a lid member on the mold in a manner to close the mouth portion, and removing, upon sufficient curing of the material, the lid member from the mold and taking out the third temporary unit from the mold together with the cured material.

11 Claims, 4 Drawing Sheets

METHOD OF MOLDING SKIN-COVERED FOAMED PLASTIC ARTICLE

BACKGROUND OF THE INVENTION

1. Field of the Invention

The present invention relates in general to a method of molding a foamed plastic article, and more particularly to a method of molding a skin-covered foamed plastic article, which generally comprises by steps placing a skin member in a mold in a manner to intimately cover the wall of the cavity of the mold, pouring a liquid material of foamed plastics into the cavity, curing the material and removing a product, viz., the skin-covered foamed plastic article from the mold upon sufficient hardening of the material.

2 Description of the Prior Art

In order to clarify the task of the present invention, one conventional method of molding a skin-covered foamed plastic article will be outlined with reference to FIGS. 10, 11 and 12.

Referring to the drawings, particularly FIG. 10, there is shown a seat 100 including a seat cushion 102 and a seatback 104 which are produced by the conventional molding method using such a mold 106 as shown in FIG. 12. As is seen from FIG. 11 which shows a cross section taken along the line XI—XI of FIG. 10, the seat cushion 102 (or the seatback 104) comprises a foamed plastic 108 serving as a structural base of the seat cushion 102, and a skin member 110 intimately covering and integrally adhered to the foamed plastic 108. The skin member 110 has a stitched portion 112 which extends along the peripheral portion of the bag-shaped skin member 110.

The conventional method of molding the seat cushion 102 (or seatback 104) is as follows:

First, the mold 106 is heated to a predetermined temperature. Then, a skin member 110 in the form of bag is put into the cavity 114 of the mold 106 with its mouth portion directed upward. Uon proper setting of the skin member 110 in the mold 106, an elongate ridge 116 formed around the wall of the cavity 114 of the mold 106 is engaged with the stitched portion 112 of the skin member 110 to assure positioning of the same with respect to the mold 106. Then, a liquid material of foamed plastics is poured into the cavity 114, and a lid 118 is placed on the mold 106 as is seen from FIG. 12. After a while, that is, after the material is cured or hardened to a certain level, a skin-covered foamed plastic article, viz., the seat cushion 102 is removed from the mold 106.

However, in the conventional method as described hereinabove, it is difficult or at least troublesome to properly set the skin member 110 in the right position in the cavity 114 of the mold 106. That is, the setting of the skin member 110 in the mold 106 should be made by stretching the operators hand or hands awkwardly within the bag-shaped skin member 110. In other words, the operator has to work blindly to set the skin member 110 in the mold 106. In fact, it sometimes occurs that the production of the seat cushion 102 (or seatback 104) is made with some unsightly creases remaining on the outer surface of the skin member 102 due to the inevitable blind work. Of course, these creases deteriorate the quality of the products.

SUMMARY OF THE INVENTION

It is therefore an essential object of the present invention to provide an improved method of molding a skin-covered foamed plastic article, which is free of the above-mentioned drawback.

According to the present invention, there is provided a method of molding a skin-covered foamed plastic article, which comprises by steps putting a skin member on a shaping device in a manner to cover the same thereby to prepare a first temporary unit, attaching shaping dies to the first temporary unit in a manner to cover the same thereby to prepare a second temporary unit, removing the shaping device from the second temporary unit thereby to prepare a third temporary unit, placing the third temporary unit in a mold in such a manner that a mouth portion of the third temporary unit is directed upward, pouring a liquid material of foamed plastics into the third temporary unit through the mouth portion, placing a lid member on the mold in a manner to close the mouth portion, and removing, upon sufficient curing of the material, the lid member from the mold and taking out the third temporary unit from the mold together with the cured material.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, an improved method of molding a skin-covered foamed plastic article will be described with reference to FIGS. 1 to 9.

Figure 1:
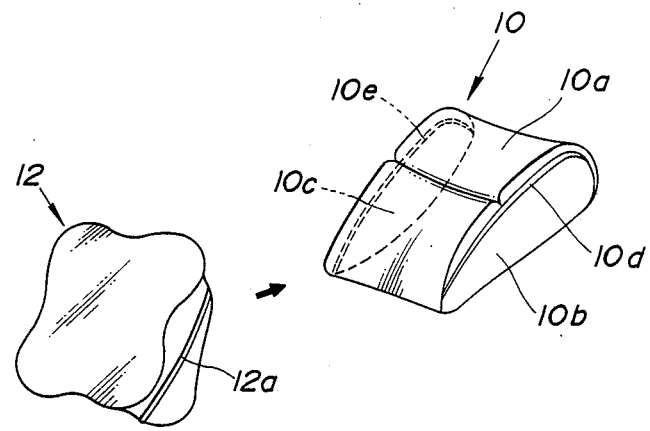
FIG. 1 is a perspective view of a shaping device employed in a method of the present invention, with a skin member which is to be put on the shaping device.
Figure 2:
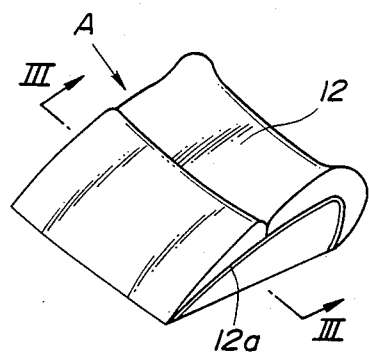
FIG. 2 is a perspective view of the shaping device with the skin member put on the same.
Figure 3:
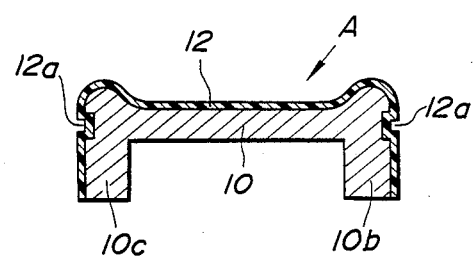
FIG. 3 is a sectional view taken along the line III—III of FIG. 2.

First, a shaping device 10, such as one shown in FIG. 1, is prepared which is constructed of, for example, rigid plastics. The shaping device 10 has an external shape which corresponds to that of a product, viz., the skin-covered foamed plastic article. The shaping device 10 illustrated in the drawings comprises a smoothly curved major portion 10a and generally triangular side portions 10b and 10c between which the major portion 10a is arranged. Each side portion 10b or 10c is formed at the outer surface thereof with a curved groove 10d or 10e which extends along the curved side edge of the major portion 10a.

Then, a skin member 12 constructed of, for example, a fabric lined with flexible plastic film is prepared which is shaped like a bag. The bag-shaped skin member 12 is put on the shaping device 10 in such a manner that an inwardly projected stitched portion 12a of the skin member 12 is neatly put in the grooves 10d and 10e of the shaping device 10 as is seen from FIG. 3

It is to be noted that the putting of the skin member 12 on the shaping device 10 can be properly and quickly achieved without producing any creases on the skin member 12 because of the simple and visual (viz., non-blind) work required by an operator. That is, even if any unsightly creases are produced on the outer surface of the skin member 12 during this work, they can be easily removed by stretching a suitable portion of the skin member 12. With these steps, a first temporary unit (A) is thus prepared.

Figure 4:
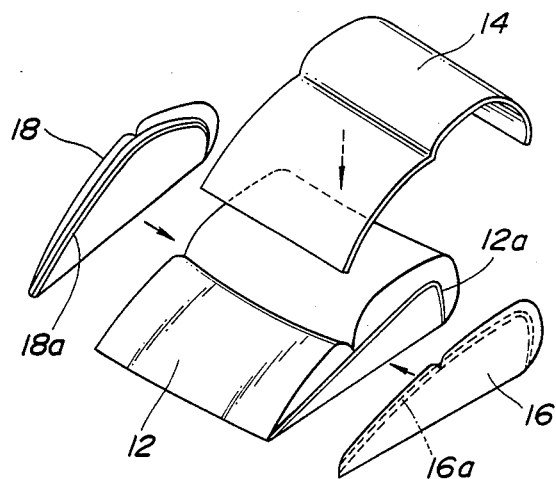
FIG. 4 is a perspective view of the skin member-wrapped shaping device with three shaping dies which are about to be attached to the shaping device.
Figure 5:
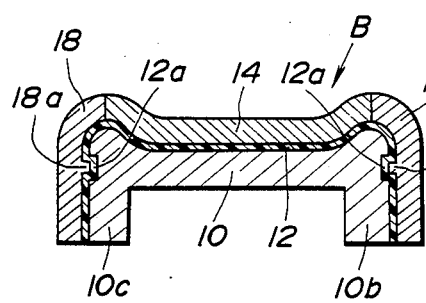
FIG. 5 is a sectional view of the skin member-wrapped shaping device with the three shaping dies properly attached to the shaping device.

Then, as is seen from FIGS. 4 and 5, three shaping dies 14, 16 and 18 are prepared which are constructed of metal or the like. The shaping dies 14, 16 and 18 are attached to the first temporary unit (A) to wrap round the same. Each side shaping die 16 or 18 is formed at the inside surface with an elongate ridge 16a or 18a which extends along the upper curved edge of the same. Although not shown in the drawings, a suitable clamping device is provided to assemble the three shaping dies 14, 16 and 18 together. Upon proper assembly, the three shaping dies 14, 16 and 18 constitute a recess the shape of which corresponds to that of the product, and at the same time, the ridges 16a and 18a of the side shaping dies 16 and 18 are pressed against the stitched portions 12a of the skin member 12. With these steps, a second temporary unit (B) is prepared.

Figure 6:
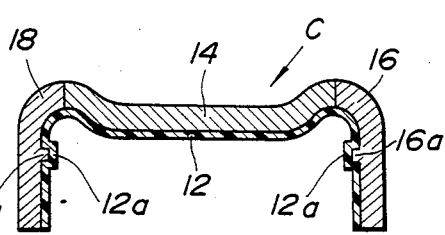
FIG. 6 is a sectional view similar to FIG. 5, but with the shaping device removed.

Then, as is seen from FIG. 6, the shaping device 10 is removed from the second temporary unit (B). With these steps, a third temporary unit (C) is thus prepared.

Figure 7:
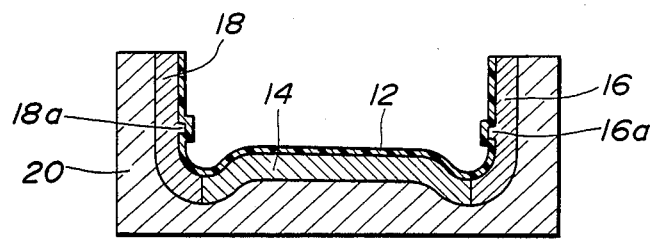
FIG. 7 is a sectional view of a mold with the assembled shaping dies and the skin member of FIG. 6 properly disposed in the mold.

Then, as is seen from FIG. 7, the third temporary unit (C) is placed in a mold 20 which has been previously heated to a predetermined temperature. Of course, the cavity 22 of the mold 20 has a shape which corresponds to that of the third temporary unit (C). It is to be noted that the removing of the shaping device 10 from the second temporary unit (B) (See FIG. 5) may be carried out after the unit is put into the mold 20.

Figure 8:
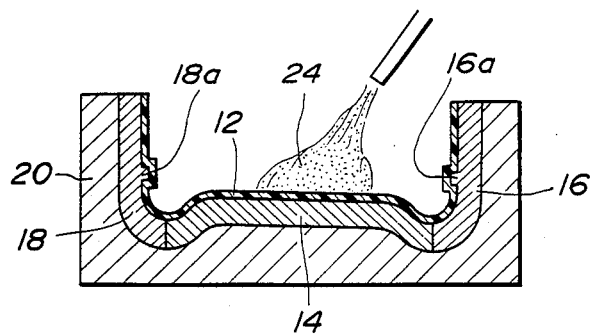
FIG. 8 is a view similar to FIG. 7, but showing a condition wherein a liquid material of foamed plastics is being poured into the mold.
Figure 9:
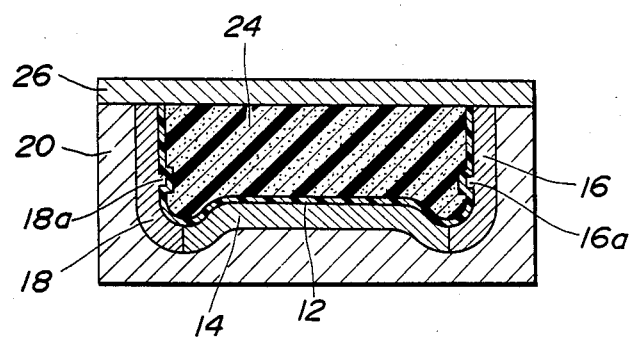
FIG. 9 is a sectional view of the mold with a lid member placed on the mold.
Figure 10:
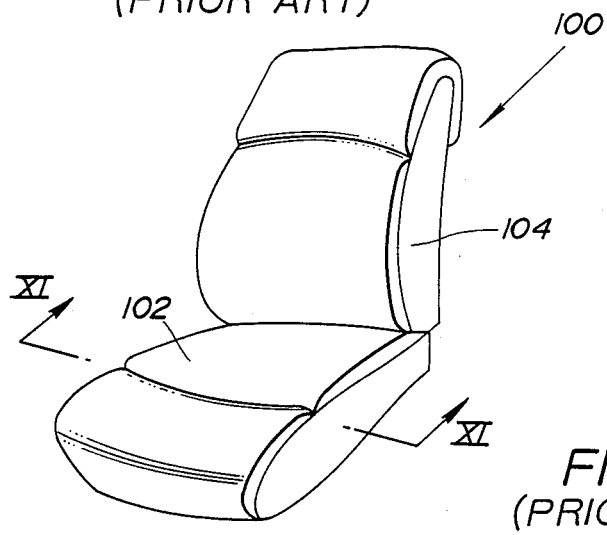
FIG. 10 is a perspective view of a seat for a motor vehicle, which has a seat cushion and a seatback which are produced through the conventional molding method as described hereinabove.
Figure 11:
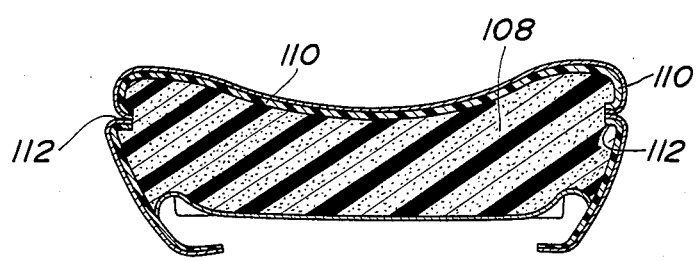
FIG. 11 is a sectional view taken along the line XI—XI of FIG. 10.
Figure 12:
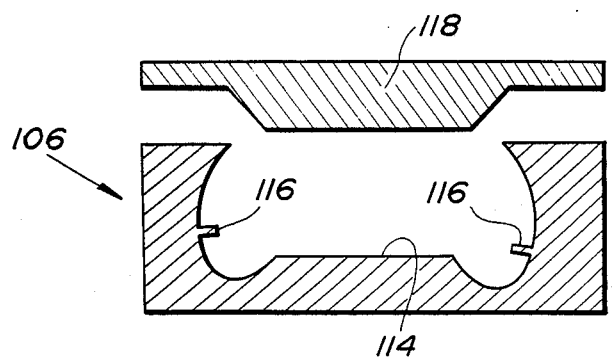
FIG. 12 is a sectional view of a mold and a lid member which are employed in the conventional molding method.

Then, as is seen from FIG. 8, a liquid material 24 of foamed plastics, such as material for foamed polyurethane or the like, is poured into the cavity 22 of the mold 20, more specifically, into the bag-shaped skin member 12 in the assembled three shaping dies 14, 16 and 18, and as is seen from FIG. 9, a lid member 26 is placed on the mold 20. Although not shown in the drawings, a suitable clamping device is arranged to clamp the lid member to the mold. Thus, thereafter, the material is forced to cure in the limited space which is defined by the bag-shaped skin member 12 and the lid member 26.

After a given time during which the material is cured to a certain degree, the lid 26 is removed from the mold 20, and then the assembled three shaping dies 14, 16 and 18 are removed from the mold 20 together with the product. Then, the three shaping dies 14, 16 and 18 are disassembled to readily release the product, viz., the skin-covered foamed plastic article, therefrom.

As is described hereinabove, in the method according to the present invention, the shaping device 10 is used for providing the skin member 12 with a desired or non-crease structure, and the three shaping dies 14, 16 and 18 are used for keeping the desired structure of the skin member 12 during molding of the product. Thus, in accordance with the present invention, it is possible to provide a well finished product, viz., well finished skin-covered foamed plastic article which is free of any unsightly creases thereon.

What is claimed is:

1. A method of molding a skin-covered foamed plastic article, comprising the steps of:
    (a) putting a skin member on a shaping device in a manner to cover the same thereby to prepare a first temporary unit, said skin member being shaped like a bag so that upon proper putting of said skin member on said shaping device, no creases are produced on the skin member;
    (b) attaching shaping dies to said first temporary unit in a manner to cover the skin member thereby to prepare a second temporary unit;
    (c) removing said shaping device after said shaping dies are attached from said second temporary unit thereby to prepare a third temporary unit with the skin member supported within said shaping dies;
    (d) placing said third temporary unit in a mold in such a manner that a mouth portion of said third temporary unit is directed upward;
    (e) pouring a liquid material of foamed plastics into said third temporary unit against the skin member through said mouth portion;
    (f) placing a lid member on said mold in a manner to close said mouth portion; and
    (g) removing, upon sufficient curing of said material, said lid member from said mold and taking out said third temporary unit from said mold together with the cured material, the skin member and cured material forming said skin-covered foamed plastic article.

2. A method as claimed in claim 1, further comprising upon completion of the step (a), putting stitched portions provided on said skin member in grooves formed in the outer surface of said shaping device.

3. A method as claimed in claim 2, further comprising upon completion of the step (b), pressing elongate ridges formed on inner surfaces of said shaping dies against said stitched portions of said skin member.

4. A method as claimed in claim 2, further comprising upon completion of the step (b), assembling said shaping dies by means of clamping means.

5. A method as claimed in claim 4, wherein said shaping dies comprise three parts.

6. A method as claimed in claim 1, further comprising, after the step (g), disassembling said shaping dies to readily release the article therefrom.

7. A method as claimed in claim 1, wherein upon proper assembly, said shaping dies constitute a recess the shape of which corresponds to that of the article.

8. A method as claimed in claim 1, further comprising before the step (d), heating said mold to a predetermined temperature.

9. A method as claimed in claim 8, wherein said liquid material is a material of foamed polyurethane.

10. A method as claimed in claim 1, further comprising, after the step (f), clamping the lid member to the mold.

11. A method according to claim 1, consisting essentially of the recited steps.

* * * * *